US012133158B2

United States Patent
Ryu

(10) Patent No.: US 12,133,158 B2
(45) Date of Patent: Oct. 29, 2024

(54) DOWNLINK ACCESS CONTROL IN 5G COMMUNICATIONS NETWORK

(71) Applicant: DISH Wireless L.L.C., Englewood, CO (US)

(72) Inventor: Jinsook Ryu, Oakton, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 414 days.

(21) Appl. No.: 17/736,961

(22) Filed: May 4, 2022

(65) Prior Publication Data

US 2023/0362791 A1 Nov. 9, 2023

(51) Int. Cl.
*H04W 48/06* (2009.01)
*H04W 72/21* (2023.01)
*H04W 72/23* (2023.01)
*H04W 72/52* (2023.01)

(52) U.S. Cl.
CPC ........... *H04W 48/06* (2013.01); *H04W 72/21* (2023.01); *H04W 72/23* (2023.01); *H04W 72/52* (2023.01)

(58) Field of Classification Search
CPC ..... H04W 48/06; H04W 72/21; H04W 72/23; H04W 72/52; H04W 76/18; H04W 68/005; H04W 92/12
See application file for complete search history.

(56) References Cited

U.S. PATENT DOCUMENTS

| | | | | |
|---|---|---|---|---|
| 11,317,318 B2* | 4/2022 | Tiwari | ................ | H04W 48/06 |
| 11,924,679 B2* | 3/2024 | Tiwari | ................ | H04W 48/06 |
| 2018/0324577 A1 | 11/2018 | Faccin et al. | | |
| 2020/0305118 A1* | 9/2020 | Ryu | ................ | H04W 76/10 |
| 2021/0029579 A1* | 1/2021 | Tiwari | ................ | H04W 48/06 |
| 2021/0092634 A1* | 3/2021 | Kang | ................ | H04W 28/04 |
| 2021/0092707 A1* | 3/2021 | Ryu | ................ | H04W 84/045 |
| 2021/0168705 A1* | 6/2021 | Fiorese | ................ | H04W 12/037 |
| 2022/0201550 A1* | 6/2022 | Tiwari | ................ | H04W 76/38 |
| 2022/0256439 A1* | 8/2022 | Casati | ................ | H04W 60/00 |
| 2022/0345879 A1* | 10/2022 | Park | ................ | H04W 80/10 |

(Continued)

FOREIGN PATENT DOCUMENTS

WO WO-2023155998 A1 * 8/2023

OTHER PUBLICATIONS

Alsaeedy et al., Mobility Management for 5G IoT Devices: Improving Power Consumption With Lightweight Signaling Overhead; IEEE internet of Things Journal., vol. 6, No. 5, Oct. 2019.*

(Continued)

*Primary Examiner* — Jay P Patel
(74) *Attorney, Agent, or Firm* — Seed IP Law Group LLP

(57) ABSTRACT

Embodiments are directed towards systems and methods for downlink access control in a communications network. An example method includes a base station receiving a request for downlink (DL) communication with a user equipment (UE), and the base station performing the following actions without communicating with the UE regarding the request for the DL communication: determining an unavailability of a resource required for the DL communication; responsive to the determined unavailability, sending a rejection of the request; determining an availability of the resource; and responsive to the determined availability, sending an indication of the availability of the resource required for the DL communication.

20 Claims, 6 Drawing Sheets

(56) References Cited

U.S. PATENT DOCUMENTS

| | | | | |
|---|---|---|---|---|
| 2023/0094999 A1* | 3/2023 | Prakasam | ............. | H04W 48/18 |
| | | | | 455/435.1 |
| 2023/0239736 A1* | 7/2023 | Suh | ....................... | H04W 76/22 |
| | | | | 370/329 |
| 2023/0276392 A1* | 8/2023 | Ianev | .................... | H04W 60/00 |
| | | | | 455/435.1 |
| 2023/0353457 A1* | 11/2023 | Hou | ........................ | H04L 41/14 |

OTHER PUBLICATIONS

3rd Generation Partnership Project, "Technical Specification Group Services and System Aspects; Service Requirements for the 5G System; Stage 1 (Release 18)," 3GPP TS 22.261, V18.6.0, Sophia Antipolis, France, Apr. 1, 2022. (114 pages).

3rd Generation Partnership Project, "Technical Specification Group Services and System Aspects; System Architecture for the 5G System (5GS); Stage 2 (Release 17)," 3GPP TS 23.501, V17.3.0, Sophia Antipolis, France, Dec. 23, 2021. (559 pages).

3rd Generation Partnership Project, Source: Nokia et al. "(TP for NR BL CR for TS 38.413): Response to R3-186766," 3GPP Draft TSG-RAN WG3, R3-187012, Spokane, USA, Nov. 12-16, 2018. (7 pages).

3rd Generation Partnership Project, Source: ZTE et al. "(TP for NR BL CR for TS 38.413) Overload Control for UAC," 3GPP Draft TSG-RAN WG3, R3-187171, Spokane, USA, Nov. 12-16, 2018. (108 pages).

International Search Report and Written Opinion, mailed Sep. 19, 2023, for Application No. PCTUS2023020712. (21 pages).

\* cited by examiner

DOWNLINK ACCESS CONTROL IN 5G COMMUNICATIONS NETWORK

BACKGROUND

The advent and implementation of Fifth Generation (5G) wireless communication technology has resulted in faster speeds and increased bandwidth, but with the drawback of potentially overloading certain portions of the network in certain circumstances. It is with respect to these and other considerations that the embodiments described herein have been made.

BRIEF SUMMARY

The present disclosure relates generally to digital communications and, more particularly, to downlink access control within a 5G communications network.

Unified access control (UAC) is defined for 5G. Relevant details can be found, for example, from TS 23.501 5.2.5 (Access Control and Barring) and TS 38.413 (N2 interface). Typically, a base station (e.g., gNB) can broadcast barring information via system information block (SIB). For mobile originated call or other access request in the uplink (UL) direction, a user equipment (UE) applies UAC based on its access category and access identity, which can be pre-configured and/or provisioned from the 5G Core.

Overload control is also defined for 5G. Relevant details can be found, for example, from TS 23.501 5.19.5 (AMF Control of Overload). Typically, Access & Mobility Management Function (AMF) or Session Management Function (SMF) can indicate overload control information at various granularities such as data domains (e.g., via Data Network Name (DNN)) or network slices (e.g., via Single Network Slice Selection Assistance Information (S-NSSAI)). Based on the overload messages or indications, base stations (e.g., gNBs) can update the UAC. For example, if a particular network slice defined by an S-NSSAI is overloaded by the AMF then the related gNB can set corresponding barring information to bar the S-NSSAI. As such, base stations can bar mobile originated setup or other access requests from UEs (in UL direction) based on associated overload information.

Significant deficiencies exist in the current UAC, as it only applies to mobile originated setup (UL direction), but not to mobile terminated setup (DL direction). For example, Radio Access Network (RAN) node-based congestion is not reflected in the UAC mechanism for DL direction (e.g., based on paging). As another example, in Radio Resource Control-Inactive (RRC-Inactive) situations, data directly arrives at Central Unit User Plane (CU-UP) and needs proper congestion management.

To address at least these issues, embodiments of the presently disclosed technology include a mobile communications system, where a base station receives a request for DL communication with a UE. Without communicating with the UE regarding the request for the DL communication: the base station determines an unavailability of a resource required for the DL communication; responsive to the determined unavailability, the base station sends a rejection of the request for the DL communication; the base station determines an availability of the resource required for the DL communication; and responsive to the determined availability, the base station sends an indication of the availability of the resource required for the DL communication.

In some embodiments, the request for the DL communication is received from a network function in a 5G Core network. In some embodiments, the network function includes an AMF. In some embodiments, the request for the DL communication includes a paging request via N2 interface.

In some embodiments, the resource required for the DL communication includes a specific network slice. In some embodiments, the rejection of the request for the DL communication includes at least one of a duration indication or location indication associated with the unavailability.

In some embodiments, the base station receives another request for the DL communication with the UE, after the sending of the indication of the availability of the resource required for the DL communication. In some embodiments, the base station communicates with the UE regarding the other request for the downlink communication.

Embodiments of the presently disclosed technology also includes a mobile communications system, where a base station determines availability of a resource for DL communication with one or more UE, sends a notification of the determined availability, and receives a request for the DL communication with a UE, in accordance with the notification.

In some embodiments, the resource for the DL communication includes a specified network slice. In some embodiments, the notification includes at least one of a duration indication or location indication associated with the availability of the specified network slice. In some embodiments, the notification is sent to a network function in a 5G Core network.

In some embodiments, based on the interactions between Central Unit Control Plane (CU-CP) and CU-UP, CU-CP may reject RRC resume or otherwise manage congested resources (e.g., by not triggering a corresponding RAN paging) in a similar manner, for example, if received data is for a congested network slice or private network.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
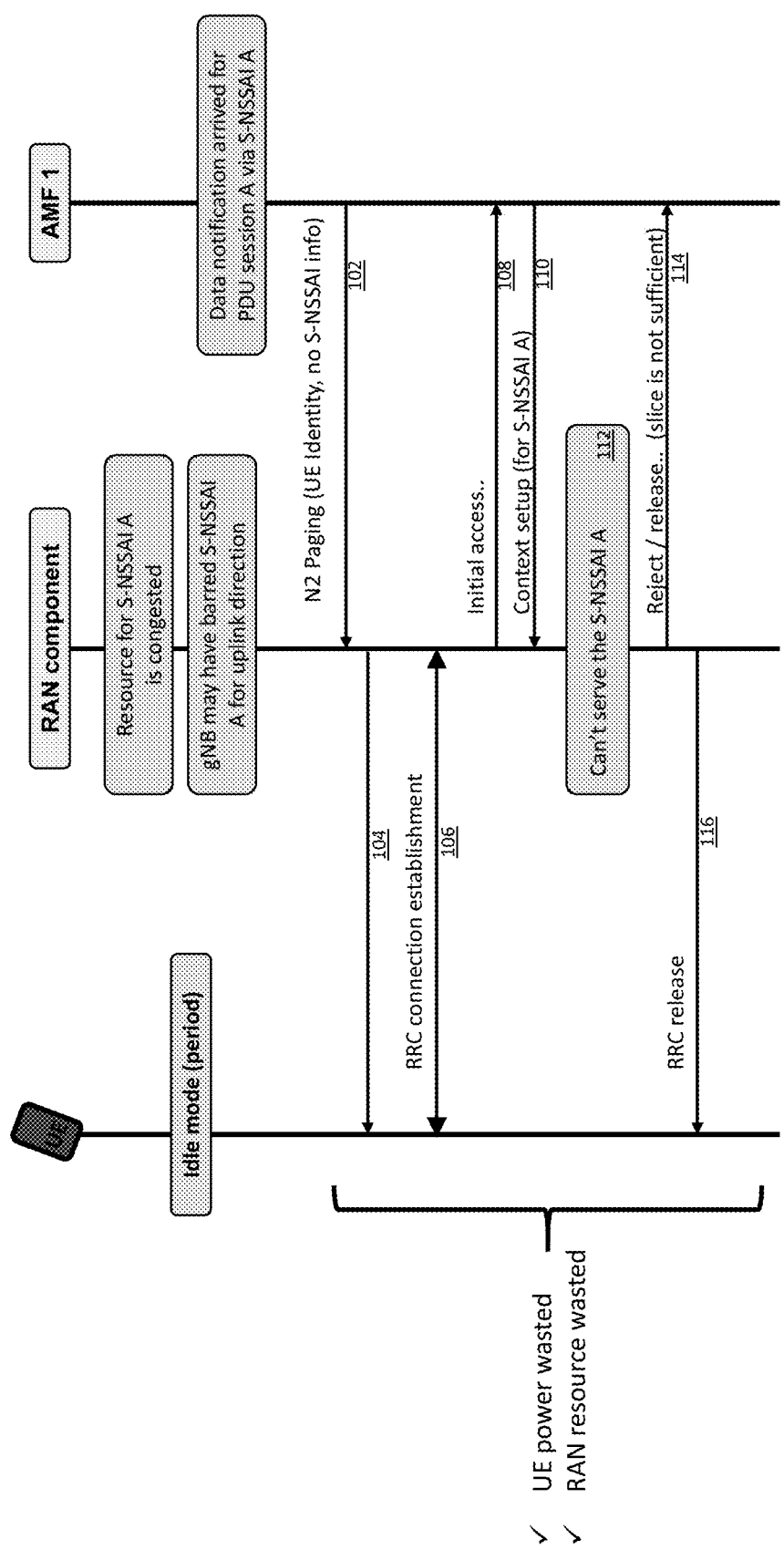
FIG. 1 illustrates an interaction diagram of a typical DL access management scenario.

FIG. 1 illustrates an interaction diagram of a typical DL access management scenario.

As illustrated, a UE (e.g., a cellular telephone, tablet, laptop, Internet-of-Things (IoT) device, or other computing device that uses 5G wireless cellular telecommunication technology defined by standards set by 3GPP and International Telecommunications Union (ITU)) is in idle mode. A base station or RAN component (e.g., gNB, CU-CP, or the like) determines that the resource for a particular network slice (e.g., as identified by S-NSSAI A) is congested, and the corresponding gNB may have barred that slice for the UL direction. At AMF 1, data notification has arrived for DL communication (e.g., to establish a Protocol Data Unit (PDU) session A, to activate an existing PDU session B, or the like) with the UE via the particular network slice (e.g., as identified by S-NSSAI A).

At 102, the AMF 1 sends a DL communication request (e.g., a paging request via N2 interface) to the RAN component. The request can indicate the UE's identify, but may not include slice information (e.g., S-NSSAI).

At 104, the RAN component relays, forwards, or otherwise causes the DL communication request to be communicated to the UE. For example, the RAN component can generate Uu paging message comprising multiple N2 paging messages.

At 106, the UE and the RAN component establishes a communicative connection (e.g., an RRC connection).

At 108, the RAN component initiates access with AMF 1.

At 110, in response, the AMF 1 initiates context setup with the RAN component for the particular slice (e.g., by indicating S-NSSAI A to the RAN component).

At 112, the RAN component determines that the particular slice cannot be served due to congestion or barring information.

At 114, the RAN component rejects the DL communication request and releases connection with AMF 1 due to insufficiency of the particular slice.

At 116, the RAN component releases the connection with the UE, concurrently with or sequentially after 114.

As can be seen, the typical DL access management is not able to properly address DL communication requests when related network resource is congested or otherwise unavailable. All or a majority of the interactions between AMF 1 and the RAN component and between the RAN component and the UE do not achieve any benefit to the mobile communications network. UE power and RAN resource are wasted, and AMF or other core network functions are not updated accordingly.

Figure 2:
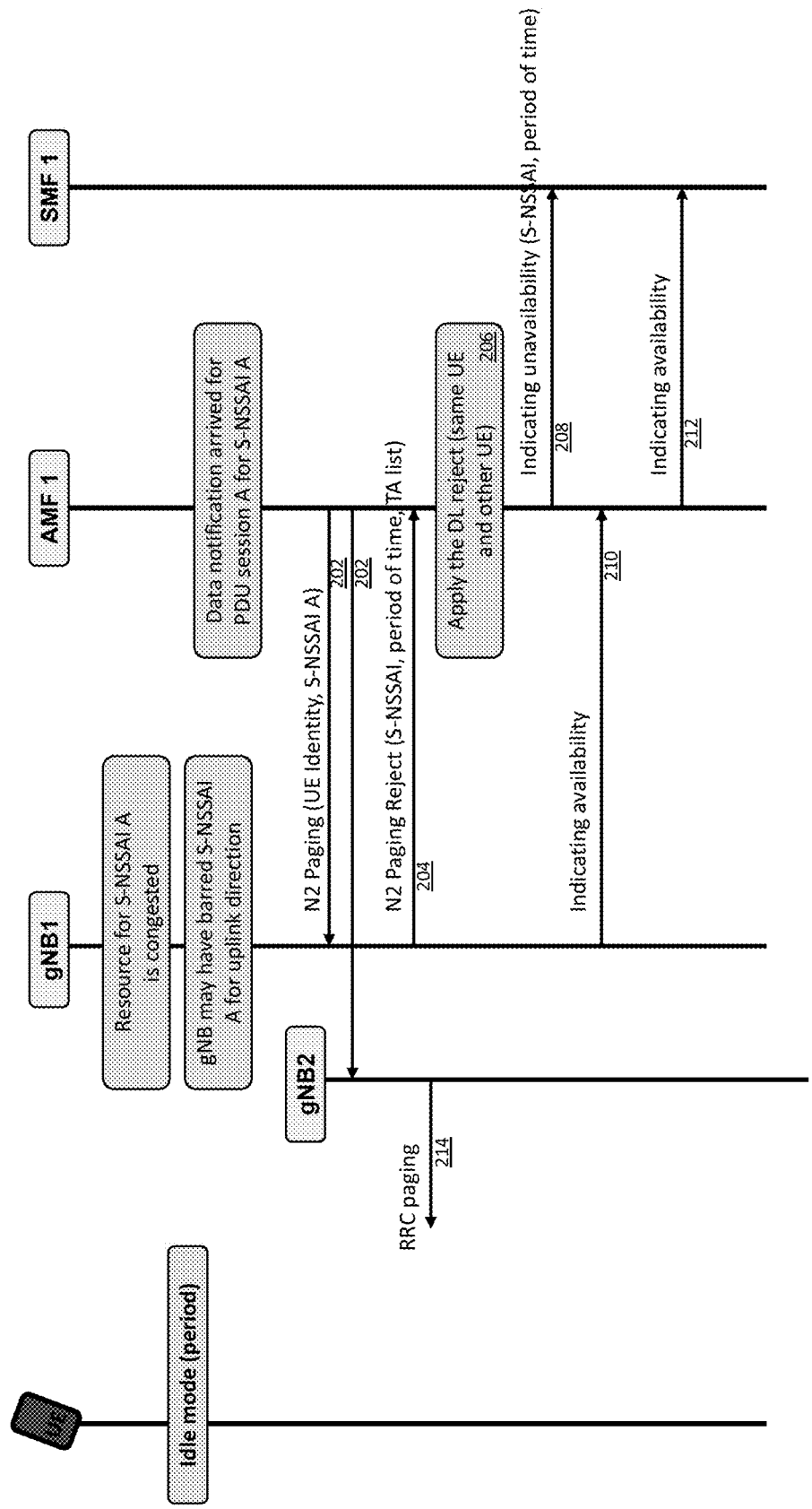
FIG. 2 illustrates an interaction diagram of an example implementation of reactive DL access management in accordance with some embodiments of the presently disclosed technology.

FIG. 2 illustrates an interaction diagram of an example implementation of reactive DL access management in accordance with some embodiments of the presently disclosed technology.

Similar to what is shown in FIG. 1, FIG. 2 shows a UE in idle mode. gNB 1 (or other RAN component) determines that the resource for a particular network slice (e.g., as identified by S-NSSAI A) is congested, and may have barred that slice for the UL direction. At AMF 1, data notification has arrived for DL communication (e.g., to establish a Protocol Data Unit (PDU) session A) with the UE via the particular network slice (e.g., as identified by S-NSSAI A). Illustratively, the data notification can be received from SMF 1, another component of 5G Core network, or other third party system or service.

At 202, the AMF 1 sends a DL communication request (e.g., a paging request via N2 interface) to gNB 1. The request can indicate the UE's identify and also include information of the required or intended network resource (e.g., a particular network slice identified by S-NSSAI).

At 204, the gNB 1 determines or confirms the unavailability of the network resource and does not relay, forward, or otherwise cause the DL communication request to be communicated to the UE; instead, gNB 1 sends a rejection of the request to the AMF 1. The rejection (e.g., N2 paging reject) can indicate unavailability of one or more resources, period of time associated with the unavailability, a set of list of tracking areas (TAs) associated with the unavailability, combination of the same or the like.

At 206, the AMF 1 processes and applies the rejection content. Illustratively, the AMF 1 can refrain from sending further DL communication requests (e.g., directed to the same UE or other UE) to gNB 1 that fall within the scope of resource unavailability indicated in the rejection.

At 208, the AMF 1 sends further indication(s) of the resource unavailability to the SMF 1, another component of the 5G Core network, or other third party system or service. The indication(s) can include the same or similar information as included in the rejection received from gNB 1.

At 210, the resource availability may have changed or otherwise differs from the rejection information sent to the AMF 1 at 204, and gNB 1 can detect or otherwise determine availability of resources and send resource availability information to the AMF 1. The resource availability information may or may not include the required or intended resource (e.g., the network slice identified by S-NSSAI A) as indicated in the DL communication request at 202.

At 212, the AMF 1 processes and further sends the resource availability information to the SMF 1, another component of the 5G Core network, or other third party system or service.

Referring back to 202, the AMF 1 can send the DL communication request (e.g., a paging request via N2 interface) to one or more other base stations (e.g., gNB 2) or RAN components, where the required or intended network resource may be available. At block 214, gNB 2 can further relay, forward, or otherwise cause the DL communication request to be communicated to the UE (e.g., via RRC paging).

As can be seen, the reactive DL access management is able to properly address DL communication requests when related network resource is congested or otherwise unavailable. The UE power and RAN resource are efficiently used, and AMF or other core network functions are timely updated to reflect network resource availability. In particular, in the reactive DL access management, the DL communication request includes information regarding the required or intended resource (e.g., N2 paging including an identification of the network slice required or intended), and gNB, CU-CP, or other RAN component can reject the DL communication request based on granular resource unavailability (e.g., rejecting incoming N2 paging per network slice).

Further, UAC can be extended to account for DL access by using the resource availability information, so a UE can de-prioritize camping to a cell in which both uplink and downlink are barred for the required or intended network resource (e.g., slice).

Figure 3:
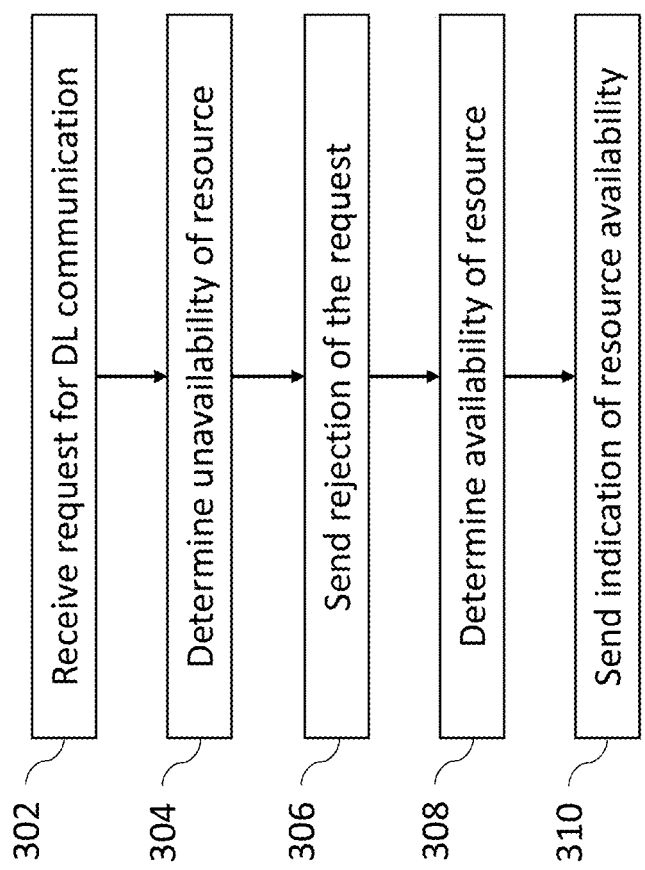
FIG. 3 illustrates a flow diagram of an example reactive DL access management process, in accordance with some embodiments of the presently disclosed technology.

FIG. 3 illustrates a flow diagram of an example reactive DL access management process 300, in accordance with some embodiments of the presently disclosed technology.

At block 302, the process 300 includes a base station (or other RAN component) receiving a request for DL communication with a UE. Without communicating with the UE regarding the request for the DL communication, the base station (or other RAN component) performs the following actions of the process 300.

At block 304, the process 300 includes determining an unavailability of a resource required for the DL communication.

At block 306, the process 300 includes, responsive to the determined unavailability, sending a rejection of the request for the DL communication.

At block 308, the process 300 includes determining an availability of the resource required for the DL communication.

At block 310, the process 300 includes, responsive to the determined availability, sending an indication of the availability of the resource required for the DL communication.

As described above, FIG. 2 provides an implementation example of the process 300. The request for the DL communication can be received from a network function in a 5G Core network. The rejection of the request for the DL communication can include at least one of a duration indication or location indication associated with the unavailability. The base station (or other RAN component) can receive another request for the DL communication with the UE, after the sending of the indication of the availability of the resource required for the DL communication. The base station can communicate with the UE regarding the other request for the downlink communication.

Figure 4:
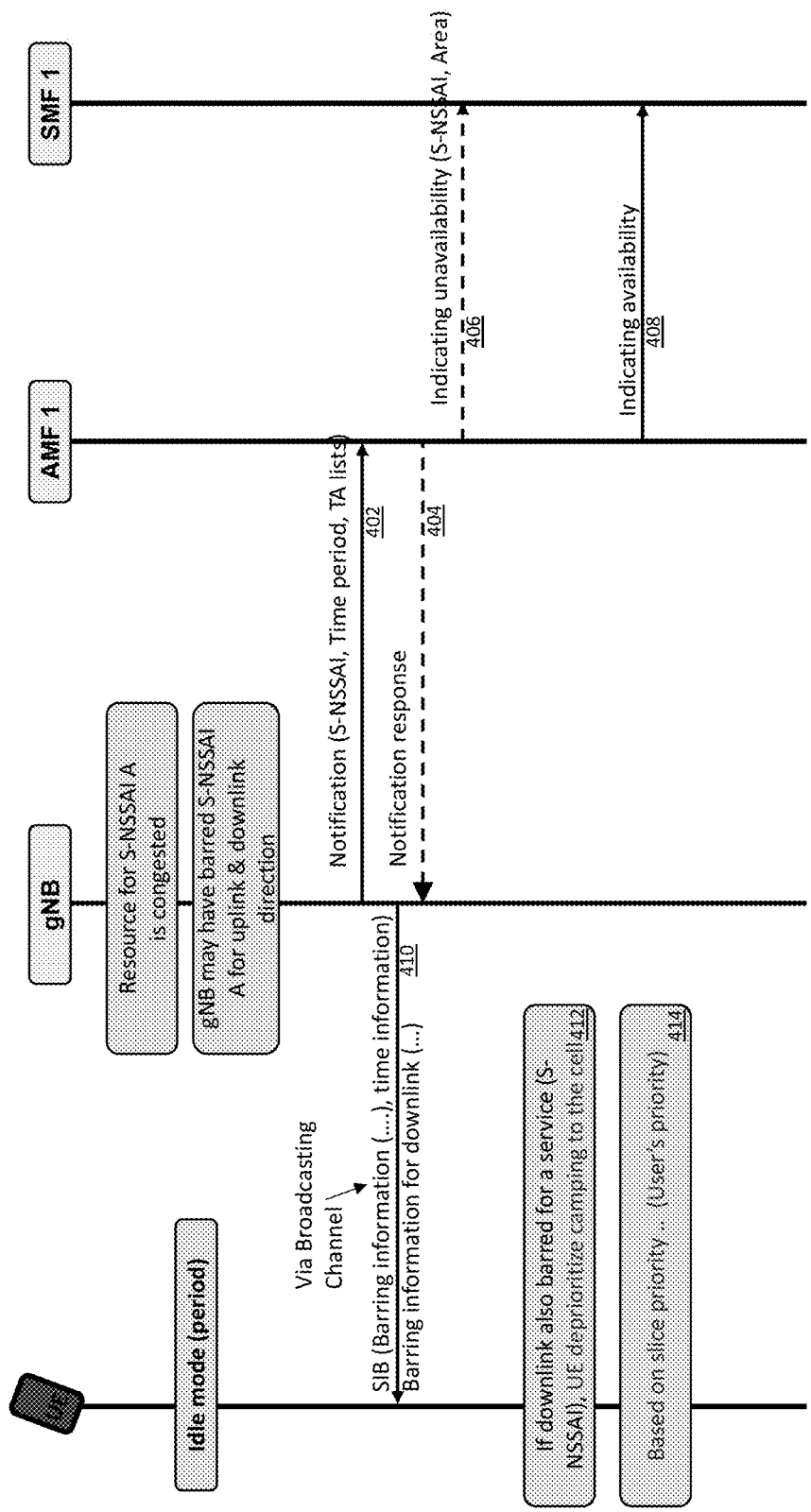
FIG. 4 illustrates an interaction diagram of an example implementation of proactive DL access management in accordance with some embodiments of the presently disclosed technology.

FIG. 4 illustrates an interaction diagram of an example implementation of proactive DL access management in accordance with some embodiments of the presently disclosed technology.

FIG. 4 shows a UE in idle mode. A gNB (or other RAN component) determines that the resource for a particular network slice (e.g., as identified by S-NSSAI A) is congested, and may have barred that slice for the UL direction and also for the DL direction.

At 402, the gNB determines availability and/or unavailability of network resource(s) useful for DL communications and sends a notification to AMF 1. The notification (e.g., via N2 interface) can indicate identification of one or more resources (e.g., network slice(s) as identified by S-NSSAI(s)), period of time associated with the availability and/or unavailability, a set of list of tracking areas (TAs) associated with the availability and/or unavailability.

At 404, the AMF 1 can acknowledge receiving the notification by sending a notification response back to the gNB.

At 406, the AMF 1 can process the notification and send an indication of resource unavailability to SMF 1, another component of 5G Core network, or other third party system or service. Illustratively, the indication of resource unavailability can be based on the content of the notification and include identification of one or more resources (e.g., network slice(s) as identified by S-NSSAI(s)), period of time associated with their unavailability, a set of list of tracking areas (TAs) associated with their unavailability. Illustratively, the AMF 1 can also refrain from sending DL communication requests (e.g., directed to the same UE or other UE) to the gNB that fall outside the scope of resource availability indicated in the notification.

At 408, the AMF 1 can process the notification and indicate availability of resource(s) to SMF 1, another component of 5G Core network, or other third party system or service, allowing them to send DL communication request(s) to the AMF 1 that require or intend to use such resource(s).

At 410, the gNB can broadcast barring information for the DL direction via one or more broadcasting channels. For example, the gNB can generate and send SIB that includes barring information for DL direction (or both UL and DL directions), associated time information, or the like.

At 412, one or more UEs can determine that DL direction is barred for certain network resource or service (e.g., a particular slice as identified by S-NSSAI) and deprioritize camping to a cell served by the gNB.

At 414, one or more UEs can determine camping onto a cell based, at least in part, on resource (e.g., slice) priority, user priority, or the like.

As can be seen, the proactive DL access management is able to properly address network resource availability and facilitate DL communication requests. The UE power and RAN resource are efficiently used, and AMF or other core network functions are timely updated to reflect network resource availability. In particular, in the proactive DL access management, if a gNB, CU-CP, or other RAN component detects congestion or otherwise determines availability of network resource(s) (e.g., one or more particular slices), it can proactively notify an AMF or other systems or services. Further, UAC can be extended to account for DL access by using the resource availability information for the DL direction, for example, based on broadcast from a gNB.

Figure 5:
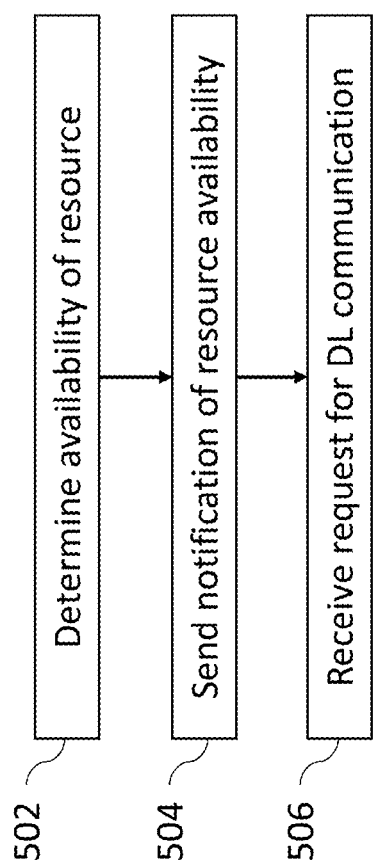
FIG. 5 illustrates a flow diagram of an example proactive DL access management process, in accordance with some embodiments of the presently disclosed technology.

FIG. 5 illustrates a flow diagram of an example proactive DL access management process 500, in accordance with some embodiments of the presently disclosed technology.

At block 502, the process 500 includes a base station (or other RAN component) determining availability of a resource for DL communication with one or more UE.

At block 504, the process 500 includes the base station sending a notification of the determined availability.

At block 506, the process 500 includes the base station receiving a request for the DL communication with a UE, in accordance with the notification.

As described above, FIG. 4 provides an implementation example of the process 500. The notification can include at least one of a duration indication or location indication associated with the availability of a specified network slice. The notification can be sent to a network function in a 5G Core network.

Those skilled in the art will appreciate that the various operations depicted via FIGS. 2-5, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 6:
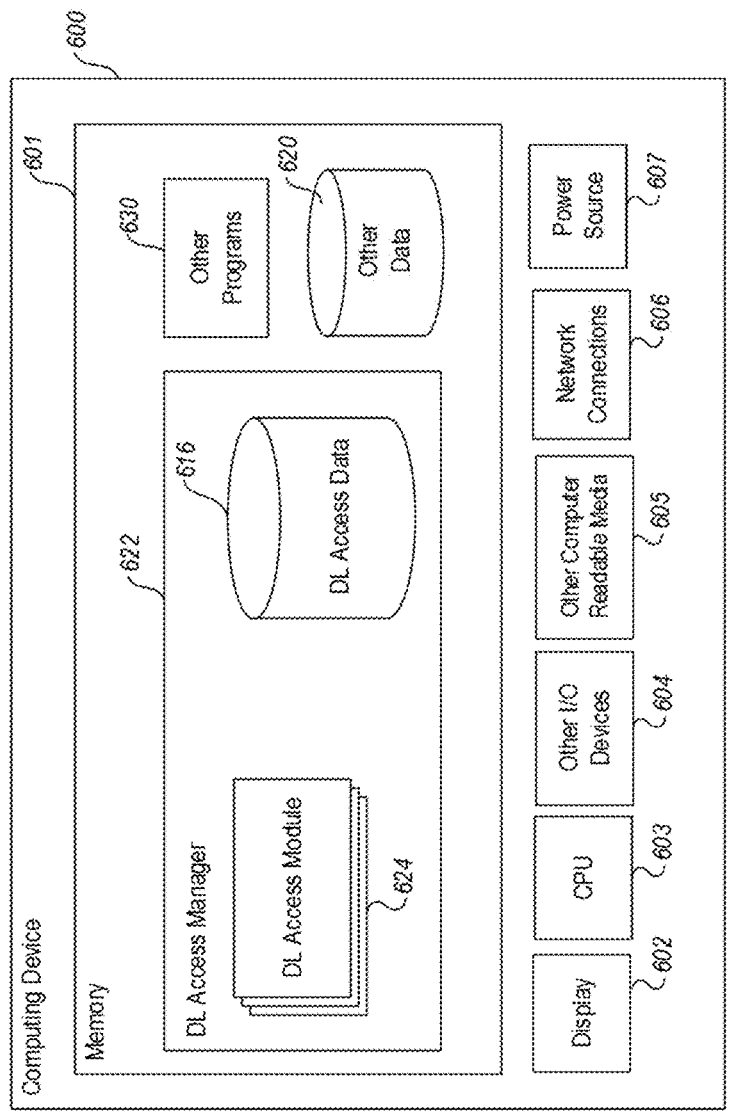
FIG. 6 is a block diagram illustrating elements of an example computing device utilized in accordance with some embodiments of the presently disclosed technology.

FIG. 6 is a block diagram illustrating elements of an example computing device 600 utilized in accordance with some embodiments of the techniques described herein. Illustratively, the computing device 600 corresponds to a base station (e.g., gNB) or other RAN component, a UE, a component of 5G Core network, or at least a part thereof.

In some embodiments, one or more general purpose or special purpose computing systems or devices may be used to implement the computing device 600. In addition, in some embodiments, the computing device 600 may include one or more distinct computing systems or devices, and may span distributed locations. Furthermore, each block shown in FIG. 6 may represent one or more such blocks as appropriate to a specific embodiment or may be combined with other blocks. Also, the downlink (DL) manager 622 may be implemented in software, hardware, firmware, or in some combination to achieve the capabilities described herein.

As shown, the computing device 600 includes a computer memory ("memory") 601, a display 602 (including, but not limited to a light emitting diode (LED) panel, cathode ray tube (CRT) display, liquid crystal display (LCD), touch screen display, projector, etc.), one or more Central Processing Units ("CPU") or other processors 603, Input/Output ("I/O") devices 604 (e.g., keyboard, mouse, RF or infrared receiver, universal serial bus (USB) ports, High-Definition Multimedia Interface (HDMI) ports, other communication ports, and the like), other computer-readable media 605, network connections 606, a power source (or interface to a power source) 607. The DL access manager 622 is shown residing in memory 601. In other embodiments, some portion of the contents and some, or all, of the components of the DL access manager 622 may be stored on and/or transmitted over the other computer-readable media 605. The components of the computing device 600 and DL access manager 622 can execute on one or more processors 603 and implement applicable functions described herein. In some embodiments, the DL access manager 622 may operate as, be part of, or work in conjunction and/or cooperation with other software applications stored in memory 601 or on various other computing devices. In some embodiments, the DL access manager 622 also facilitates communication with peripheral devices via the I/O devices 604, or with another device or system via the network connections 606.

The one or more DL access modules 624 is configured to perform actions related, directly or indirectly, to downlink access control as described herein. In some embodiments, the DL access module(s) 624 stores, retrieves, or otherwise accesses at least some downlink access related data on some portion of the DL access data storage 616 or other data storage internal or external to the computing device 600. In various embodiments, at least some of the DL access modules 624 may be implemented in software or hardware.

Other code or programs 630 (e.g., further data processing modules, communication modules, a Web server, and the like), and potentially other data repositories, such as data repository 620 for storing other data, may also reside in the memory 601, and can execute on one or more processors 603. Of note, one or more of the components in FIG. 6 may or may not be present in any specific implementation. For example, some embodiments may not provide other computer readable media 605 or a display 602.

In some embodiments, the computing device 600 and DL access manager 622 include API(s) that provides programmatic access to add, remove, or change one or more functions of the computing device 600. In some embodiments, components/modules of the computing device 600 and DL access manager 622 are implemented using standard programming techniques. For example, the DL access manager 622 may be implemented as an executable running on the processor(s) 603, along with one or more static or dynamic libraries. In other embodiments, the computing device 600 and DL access manager 622 may be implemented as instructions processed by a virtual machine that executes as one of the other programs 630. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 600 to perform the functions of the DL access manager 622. In some embodiments, instructions cause the one or more processors 603 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a DL access manager 622 implementation. Also, other functions could be implemented and/or performed by each component/module, and in different orders, and by different components/modules, yet still achieve the functions of the computing device 600 and DL access manager 622.

In addition, programming interfaces to the data stored as part of the computing device 600 and DL access manager 622, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The DL access data storage 616 and data repository 620 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the DL access manager 622.

Furthermore, in some embodiments, some or all of the components of the computing device 600 and DL access manager 622 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a memory that stores contents; and
one or more processors that execute the contents to perform actions comprising:
receiving, at a base station, a request for downlink communication with a user equipment (UE);
without communicating with the UE regarding the request for the downlink communication:
determining, by the base station, an unavailability of a resource required for the downlink communication;
responsive to the determined unavailability, sending, by the base station, a rejection of the request for the downlink communication;
determining, by the base station, an availability of the resource required for the downlink communication; and
responsive to the determined availability, sending, by the base station, an indication of the availability of the resource required for the downlink communication.

2. The system of claim 1, wherein the request for the downlink communication is received from a network function in a Fifth Generation (5G) Core network.

3. The system of claim 2, wherein the network function includes an Access & Mobility Management Function (AMF).

4. The system of claim 1, wherein the request for the downlink communication includes a paging request via N2 interface.

5. The system of claim 1, wherein the resource required for the downlink communication includes a specified network slice.

6. The system of claim 5, wherein the rejection of the request for the downlink communication includes at least one of a duration indication or location indication associated with the unavailability.

7. The system of claim 1, wherein the actions further comprises receiving, at the base station, another request for the downlink communication with the UE, after the sending of the indication of the availability of the resource required for the downlink communication.

8. The system of claim 7, wherein the actions further comprises communicating with the UE regarding the other request for the downlink communication.

9. A method, comprising:
receiving, at a base station, a request for downlink communication with a user equipment (UE);
without communicating with the UE regarding the request for the downlink communication:
determining, by the base station, an unavailability of a resource required for the downlink communication;
responsive to the determined unavailability, sending, by the base station, a rejection of the request for the downlink communication;
determining, by the base station, an availability of the resource required for the downlink communication; and
responsive to the determined availability, sending, by the base station, an indication of the availability of the resource required for the downlink communication.

10. The method of claim 9, wherein the request for the downlink communication is received from a network function in a Fifth Generation (5G) Core network.

11. The method of claim 10, wherein the network function includes an Access & Mobility Management Function (AMF).

12. The method of claim 9, wherein the request for the downlink communication includes a paging request via N2 interface.

13. The method of claim 9, wherein the resource required for the downlink communication includes a specified network slice.

14. The method of claim 13, wherein the rejection of the request for the downlink communication includes at least one of a duration indication or location indication associated with the unavailability.

15. The method of claim 9, further comprising receiving, at the base station, another request for the downlink communication with the UE, after the sending of the indication of the availability of the resource required for the downlink communication.

16. The method of claim 15, further comprising communicating with the UE regarding the other request for the downlink communication.

17. A non-transitory computer-readable storage medium having contents stored thereon that, when executed by at least one computer processor, cause actions to be performed, the actions comprising:

determining, by a base station, availability of a resource for downlink communication with one or more user equipment (UE);

sending, by the base station, a notification of the determined availability;

receiving, at the base station, a request for the downlink communication with a UE, in accordance with the notification.

18. The non-transitory computer-readable storage medium of claim 17, wherein the resource for the downlink communication includes a specified network slice.

19. The non-transitory computer-readable storage medium of claim 18, wherein the notification includes at least one of a duration indication or location indication associated with the availability of the specified network slice.

20. The non-transitory computer-readable storage medium of claim 17, wherein the notification is sent to a network function in a Fifth Generation (5G) Core network.

\* \* \* \* \*